United States Patent Office 2,718,492
Patented Sept. 20, 1955

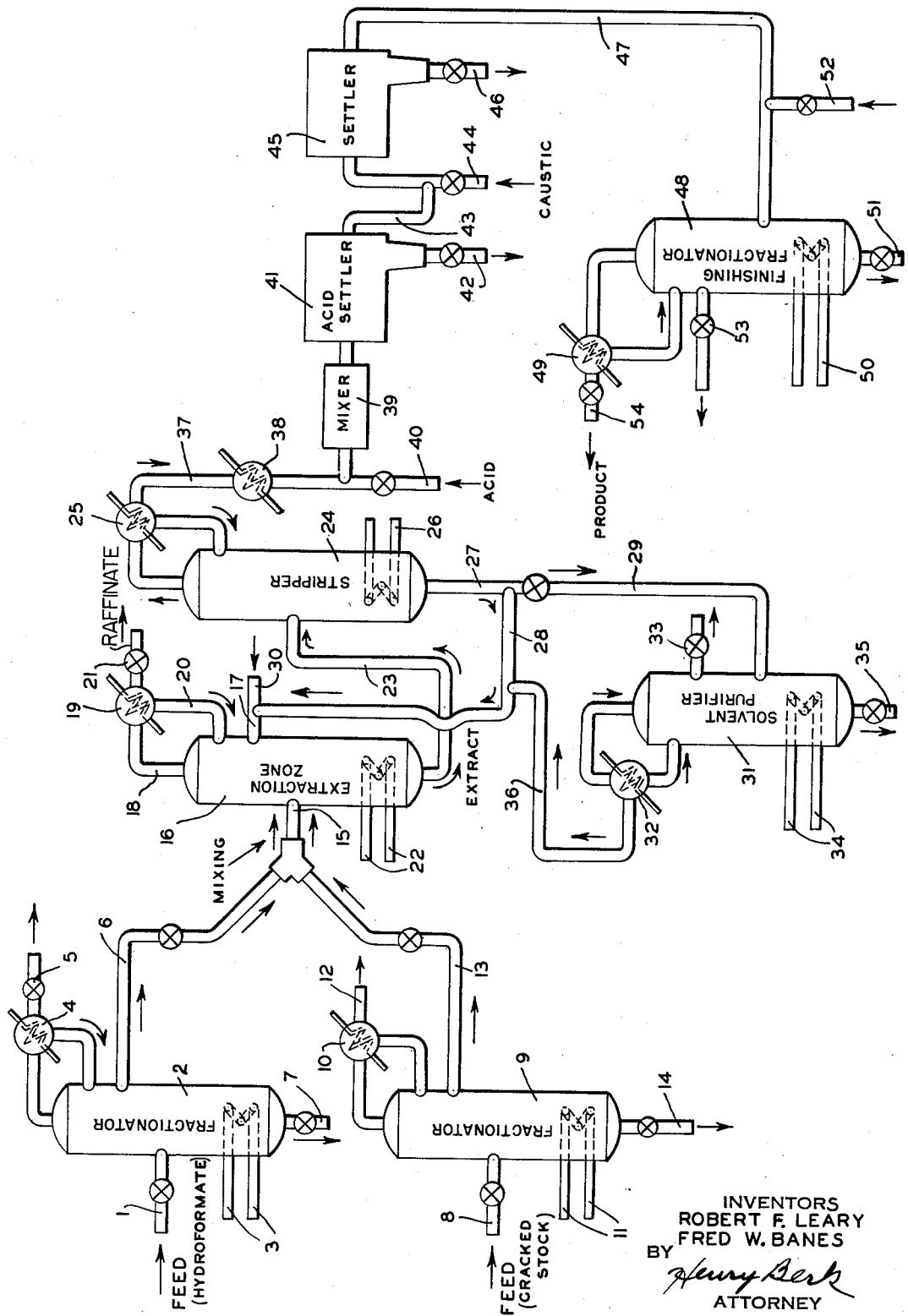

2,718,492

BENZENE PURIFICATION FROM MIXED FEED STOCKS BY EXTRACTIVE DISTILLATION

Robert F. Leary, Cranford, and Fred W. Banes, Westfield, N. J., assignors to Esso Research and Engineering Company, a corporation of Delaware Application October 26, 1953, Serial No. 388,114

3 Claims. (Cl. 202—39.5)

This invention deals with purification of benzene from mixed crude feed stocks, one of which is essentially a saturated or hydrogenated stock, e. g. hydroformate, the other being a stock containing unsaturates.

Before the present invention, a crude benzene feed stock substantially free of unsaturates, i. e. free of alkenes and dienes, was required to be fractionated with very great care to have a certain true final boiling point not much higher than the boiling point (80.1° C.) of benzene when subjected to extractive distillation with phenol or similar extractive distillation solvent in order for the extracted benzene to meet strict specification requirements (ASTM spec. D–835–47), e. g. "a solidifying point no lower than 4.85° C." Saturated hydrocarbon impurities close boiling and slightly higher boiling than benzene, e. g. cyclohexane, 2,2,3-trimethyl butanes, and 2,3-dimethyl pentane, are difficult to separate from the benzene by fractional distillation, extractive distillation or chemical treatments and such impurities in amounts of even a fraction of 1% prevent the benzene from meeting the specification requirements.

In accordance with the present invention a feed stock containing unsaturated hydrocarbons having substantially higher boiling points than benzene is added in proper proportions to the essentially saturated feed stock to obtain a mixed feed stock more suitable for the extractive distillation and recovery of the specification nitration-grade benzene.

In the extractive distillation a certain amount of the olefinic components are made to remain preferentially with the benzene in the solvent extract, thereby displacing saturated hydrocarbon impurities. The extracted olefinic impurities are essentially and completely removed from the benzene when it is stripped from the solvent by treatment with concentrated sulfuric acid, followed by settling to remove acid sludge, neutralization, and redistillation.

With the procedure using the proportioned saturated and unsaturated benzene feed stocks, the extraction can be operated at high recovery levels since the purity of the crude aromatic from this mixture is not so critical as it is with saturated feed stocks.

In preparing the saturated feed stocks, it may be cut so that its end point is up to about 5° C. above the boiling point of the benzene. On the other hand, the unsaturated feed stock to be admixed advantageously contains $C_6$ and $C_7$ olefins having boiling points up to about 95° C. For example, the olefinic components which may be used include 3-methyl-1-hexene, 4-methyl-1-hexene, 5-methyl-1-hexene, 4-methyl-2-hexene, 2-ethyl-1-pentene, 2,3-dimethyl-1-pentene, cyclohexene and dimethyl cyclopentene. With adequate amounts of such olefins present during the extractive distillation the benzene is extracted with at least some of them and preferentially with cyclic $C_6$—$C_7$ olefins on account of their low relative volatilities, as will be shown.

A preferred method of operation will be described with reference to the accompanying drawing in which is shown a schematic flow plan for preparing the mixed feed stock, extractively distilling the mixed feed stock, and thereafter recovering the purified benzene.

Referring to the drawing, the essentially saturated crude benzene feed stock is supplied through line 1 to a fractionation column 2, equipped with a reboiler 3 and reflux condenser 4. Hydrocarbons lower boiling than benzene are withdrawn with as little benzene as practical as the overhead product through line 5. The benzene cut to be further processed is withdrawn as an intermediate fraction or as a side stream by line 6. Higher boiling saturated hydrocarbons are rejected in the bottoms withdrawn through line 7.

The other crude benzene feed stock, in which the impurities are mainly olefinic, is preferably pretreated to remove most of the diolefinic impurities. The feed is introduced by line 8 to fractionating column 9 equipped with an overhead reflux condenser 10 and reboiler 11. This column is run to remove as overhead distillate product through line 12 hydrocarbon contaminants which are relatively free of benzene. The desired benzene cut is withdrawn as an intermediate fraction or side stream from column 9 by line 13. Higher boiling components stripped of benzene are withdrawn as a bottoms fraction by line 14. The benzene cuts which are the intermediate fractions from columns 2 and 9 are mixed in line 15 in suitable proportions to form the mixed feed stock which is passed into the extractive distillation column 16 in which the extractive distillation is to be performed.

Columns 2 and 9 can be operated under proper conditions to have the intermediate benzene cuts of desired end point respectively.

In the extractive distillation column 16, the phenol or solvent introduced by line 17 is made to flow countercurrent to vapors rising from the feed inlet 15. Raffinate vapors taken overhead from column 16 by line 18 are passed to the reflux condenser 19. Reflux is returned by line 20. Remaining raffinate distillate is withdrawn by line 21. Reboiler 22 supplies heat to the bottom of column 16. The solvent extract of benzene with a desired amount of preferential extracted unsaturates is withdrawn by line 23 to an intermediate part of stripping column 24. The extractive distillation column 16 is operated with a sufficient number of plates and reflux conditions to make practically all but a negligible fraction of 1% of paraffins distill overhead while leaving amounts of 2 to 8% of olefins based on the extracted benzene in the solvent extract which is withdrawn through the bottoms withdrawal line 23.

Stripping column 24 is provided with reflux condenser 25 for the overhead benzene-olefin distillate and bottoms reboiler 26. The stripped solvent is withdrawn through line 27 and a major portion thereof can be recycled through line 28 to the solvent feed line 17. A portion of the stripped solvent may be withdrawn for purification, e. g., to remove byproducts and sludge by line 29. Makeup solvent may be introduced by line 30.

A portion of the stripped solvent withdrawn by line 29 is passed to a purifying still column 31 provided with a reflux condenser 32, an intermediate or side stream line 33 for removal of an aromatic cyclic ether fraction, a bottoms reboiler 34 and a sludge removal line 35. Even though the cracked crude benzene fraction may contain an appreciable amount of acyclic diene components, e. g., methyl pentadiene, no difficulty is encountered since such dienes undergo a reaction with phenol to form an aromatic cyclic ether which can be partly returned with the purified phenol and partly recovered as a byproduct separate from the heavier sludge which includes alkylated phenol and polymers. Thus, the distilled phenol may contain some of the aromatic cyclic ethers which are compounds such as chromans and coumarans, which is returned from the reflux condenser 32 by line 36 to the recycle line 28. The aromatic cyclic ethers act as a diluent in the phenol without adverse effects in separating non-aromatics from the benzene being extracted with a small amount of the olefins in the extractive distillation column 16.

The benzene olefin distillate is withdrawn from the reflux condenser 25 by line 37 through a cooler 38 to a mixer 39. Sulfuric acid of proper strength is supplied to the mixer 39 from line 40. For the acid treatment from 80 to about 100% strength $H_2SO_4$ may be used in amounts of the order of 10 to 40 pounds per barrel of the benzene-olefin distillate. The treated benzene and spent acid are separated in the settling vessel 41. The acid sludge is withdrawn as a bottoms layer from vessel 41 by line 42, the treated benzene is decanted from vessel 41 by line 43 and is mixed with neutralizing solution such as 10% caustic solution from line 44, then is passed to settling vessel 45. The spent caustic is withdrawn from the bottom layer by line 46, the neutralized benzene is decanted and passed by line 47 to the finishing fractionator 48.

Fractionator 48 is equipped with the overhead reflux condenser 49, bottoms reboiler 50 and bottoms drain 51.

A heavy or high boiling flux oil, e. g. a gas oil, may be added with additional caustic solution to the feed line 47 by line 52. Fractionating column 48 is operated to distill overhead the finished benzene. If desired, a finished benzene product may be withdrawn as an upper side stream through line 53. A high purity distillate product may also be withdrawn from the reflux condenser line 54. These finished benzene products have a mole % purity of 99+. They meet exacting requirements of the ASTM specification on nitration grade benzene including a solidifying point of the benzene not lower than 4.85° C. and acid wash color no darker than #2 as per ASTM spec. D–835–47.

Earlier tests had indicated that a substantially saturated crude benzene fraction, such as a hydroformate, had to be subjected to an expensive closely controlled precision fractionation to obtain a benzene cut which could be purified by extractive distillation to meet the specification requirements. Such a benzene cut could not have an end point appreciably higher than about 80° C. if it is to be free of isoparaffins which are substantially higher boiling than benzene and would accordingly remain with the extracted benzene. However, it was determined that the same crude hydroformate cut could be fractionated more economically to obtain a saturated crude benzene fraction boiling in the range of 60 to about 85° C. and then be satisfactorily purified when mixed with a similar wide boiling and preferably higher end point cut of a cracked benzene fraction containing acyclic and cyclic monoolefins and possibly some acyclic diolefins.

To demonstrate the effects of the unsaturated crude benzene cut, the following example is given:

EXAMPLE

A sample of hydroformate was fractionated in a packed column (approximately 50 plates) at 10/1 reflux ratio to obtain a 60°–85° distillate, as in column 2, shown in the drawing. A high temperature vapor phase cracked naphtha fraction was distilled as in column 9 to obtain a 60°–95° C. cut and this was mixed in equal volume with the cut from column 2. The blend contained 43.6 volume % of benzene and about 26% of unsaturated hydrocarbons. This blend was subjected to the extractive distillation as in column 16 using an aromatic cyclic ether diluted phenol solvent and controlling the extractive distillation to leave 3 to 6 weight % of olefin in the phenol extract with the benzene. The benzene-olefin stripped from the solvent was acid treated, caustic washed and redistilled and the final benzene product showed a freezing point of 5.51° C., and acid wash color of 0, and a benzene purity of 99.95 wt. %. About 97.5% of the benzene in the feed was recovered.

The mixed crude benzene feeds, even those containing high conjugated diene contents, permitted surprisingly high recovery of benzene at high purity, i. e. above 99 weight %.

The typical kinds of feed stocks to be mixed and the mixtures to be subjected to the solvent extractive distillation specification are illustrated in the following table:

TABLE I

*Mixed feed stocks*

| Components | Hydroformate | Cracked | Mixed 50/50 |
|---|---|---|---|
| Benzene | 35–55 | 35–55 | 35–55 |
| Alkene |  | 65–40 | 32–20 |
| Diene (acyclic) |  | 0.1–4 | 0.1–2 |
| Alkane and Naphthene | 65–45 | .1–1 | 32–22 |
| Boiling Ranges, ° C. | 60–85 | 60–95 | 60–95 |

It is to be noted, in general, the desired mixed feed stocks will have a substantial monoolefin content. They may contain an appreciable amount of acyclic dienes and may have a higher end boiling point than a saturated feed stock.

Any other source of the $C_6$–$C_7$ olefins may be used in place of the crude cracked benzene fraction. For example, a 60–95° C. cut of a material prepared by olefin polymerization can be used.

While the invention is not intended to be limited by any theory regarding the improvement effected by the presence of olefins and diolefins in the mixed feed, studies have been made to determine the manner in which the olefinic components of relatively higher boiling point displace the saturated hydrocarbon components (paraffins and naphthenes) in the extractive distillation where they otherwise tend to remain with the benzene and thereafter be difficult to remove.

The following data demonstrates that the volatility of the paraffin relative to the benzene in the presence of the extractive distillation solvent is considerably higher than the volatility of the corresponding olefins.

TABLE II

*Relative volatilities of non-aromatics to benzene in phenol*

| | |
|---|---|
| 2,4-dimethylpentane (B. P. 80.6° C.) | 2.37 |
| Cyclohexane (B. P. 80.8° C.) | 2.01 |
| 2,4-dimethylpentene-2 (B. P. 82.8° C.) | 2.07 |
| Hexene-1 (B. P. 63.7° C.) | 1.78 |
| Cyclohexene (B. P. 83.2° C.) | 1.44 |
| Heptene-1 (B. P. 95° C.) | 1.78 |
| Methylpentadiene (B. P. 76° C.) | 1.45 |

On the basis of the data such as shown in Table II, it was found that cyclic olefins and straight chain olefins having boiling points above 80° C. can be made to displace the more volatile paraffins and remain in a minor amount with the extracted benzene in the phenolic solvent. These studies indicated that to insure preferential extraction of the olefins, the mixed feed may contain olefins boiling up to 95° C. and the olefins may be present in the mixed feed in amounts ranging from about 10 to 32%.

Major features of the process are:

(a) The blending of the cracked or olefinic feed stock with the saturated feed stock reduces the overall diene content thus limiting excessive reaction of dienes to sludge in the extraction.

(b) The aromatic-olefinic distillate containing 2–8 weight per cent of the olefins and less than 1 wt. per cent saturate impurities when stripped from the extract solvent can be readily purified to the specification grade aromatic hydrocarbon by a sulfuric acid treatment followed by neutralization and rerunning.

While the invention is described particularly with regard to benzene, toluene cuts may be treated similarly using C₈ olefinic or cracked stock containing C₈ olefins to aid in displacing C₇–C₈ saturates from the solvent extract.

In place of phenol or phenolic solvents, e. g. cresylic acid, other known solvents, such as furfural, ethylene glycol, etc. may be used. Even in a liquid liquid extraction with such solvents, the olefins may be used to displace the paraffinic hydrocarbons from the solvent extract of the aromatic hydrocarbons.

Having described the invention, it is claimed as follows:

1. In a process of recovering by preferential solvent extraction a purified $C_6$–$C_7$ aromatic hydrocarbon from an impure fraction thereof in which principally saturated hydrocarbons close-boiling to the aromatic hydrocarbon are present, the improvement which comprises admixing with said fraction a sufficient quantity of olefins up to 10° C. higher boiling than said saturated hydrocarbons, then extractively distilling the resulting mixture under conditions to leave in the preferential solvent 2 to 8 wt. per cent of the olefins with the aromatic hydrocarbon extracted.

2. In a process for recovering pure benzene from a hydroformed petroleum hydrocarbon distillate containing the benzene contaminated by saturated hydrocarbons boiling at temperatures in the range of 60° to 85° C., the improvement which comprises blending said crude benzene with a cracked benzene fraction containing $C_6$–$C_7$ olefins and acyclic diolefins, then extractively distilling the said blend under conditions to maintain a 2 to 8 wt. per cent of the olefinic hydrocarbons with the benzene in the solvent.

3. In a process for recovering pure benzene from a petroleum hydrocarbon distillate containing the benzene contaminated by alkane and naphthene components boiling in the range of 60° to 85° C., the improvement which comprises blending said benzene fraction with a cracked benzene fraction containing olefinic and acyclic diolefins boiling in the range of 60° to 95° C., then extractively distilling the resulting blend with a phenol solvent under conditions to maintain from 2 to 8 weight per cent of olefin with the benzene and subsequently stripping the benzene with said olefins from the phenol solvent extract.

References Cited in the file of this patent

UNITED STATES PATENTS

| | | |
|---|---|---|
| Re. 22,379 | Dunn et al. | Sept. 28, 1943 |
| 2,168,691 | Voorhees | Aug. 8, 1939 |
| 2,357,344 | Morris et al. | Sept. 5, 1944 |
| 2,366,570 | Souders, Jr., et al. | Jan. 2, 1945 |
| 2,378,808 | Sweeney | June 19, 1945 |
| 2,537,459 | Griswold | Jan. 9, 1951 |

OTHER REFERENCES

Griswold et al.: "Separation of Straight-Run Fractions by Distex Process," Industrial and Engineering Chemistry, January 1946, vol. 38, No. 1.

Griswold et al.: "Composition of C₆ Fraction of Catalytic Gasoline," Industrial and Engineering Chemistry, March 1949, vol. 41, No. 3.